(12) United States Patent
Kudo

(10) Patent No.: US 11,293,568 B2
(45) Date of Patent: Apr. 5, 2022

(54) HOLDING STRUCTURE FOR ELONGATED MEMBER

(71) Applicant: Sumitomo Wiring Systems, Ltd., Mie (JP)

(72) Inventor: Yasuhiro Kudo, Mie (JP)

(73) Assignee: Sumitomo Wiring Systems Ltd., Yokkaichi (JP)

( * ) Notice: Subject to any disclaimer, the term of this patent is extended or adjusted under 35 U.S.C. 154(b) by 107 days.

(21) Appl. No.: 16/618,849

(22) PCT Filed: Jun. 15, 2018

(86) PCT No.: PCT/JP2018/022864
§ 371 (c)(1),
(2) Date: Dec. 3, 2019

(87) PCT Pub. No.: WO2019/009043
PCT Pub. Date: Jan. 10, 2019

(65) Prior Publication Data
US 2021/0278016 A1 Sep. 9, 2021

(30) Foreign Application Priority Data
Jul. 4, 2017 (JP) .............................. JP2017-131044

(51) Int. Cl.
*F16L 3/137* (2006.01)
*B60R 16/02* (2006.01)
*H02G 3/30* (2006.01)

(52) U.S. Cl.
CPC .......... *F16L 3/137* (2013.01); *B60R 16/0215* (2013.01); *H02G 3/30* (2013.01)

(58) Field of Classification Search
CPC ...... F16L 3/137; B60R 16/0215; B60R 16/02; H02G 3/30; H02G 3/32; H02G 15/013; H01L 37/0045; H01R 2201/26
See application file for complete search history.

(56) References Cited

U.S. PATENT DOCUMENTS 3,794,960 A * 2/1974 Sugar ................. H01R 13/5804
439/459
3,936,129 A * 2/1976 Guy ..................... H01R 13/516
439/464

(Continued)

FOREIGN PATENT DOCUMENTS

| JP | 08-291881 | 11/1996 |
| JP | 2003-125523 | 4/2003 |
| JP | 2016-181961 | 10/2016 |

OTHER PUBLICATIONS

International Search Report dated Jul. 10, 2018.

*Primary Examiner* — Nkeisha Smith
(74) *Attorney, Agent, or Firm* — Gerald E. Hespos; Michael J. Porco; Matthew T. Hespos

(57) ABSTRACT

A wiring harness 1 includes a wire 11, a binding band 20 to be wound on and fixed to the wire 11 and a housing 30 to be externally mounted on the wire 11. The housing 30 includes a restricting groove 46 for receiving the binding band 20. A displacement of the wire 11 with respect to the housing 30 is restricted by the binding band 20 being locked to a groove side surface 46A of the restricting groove 46. According to this configuration, manufacturing tolerances and assembling tolerances can be absorbed by setting certain clearances between the binding band 20 and the groove side surfaces 46A. Further, even if a tensile force is applied to the wire 11, the deviation of a winding position of the binding band 20 on the wire 11 can be suppressed.

3 Claims, 7 Drawing Sheets

(56) References Cited

U.S. PATENT DOCUMENTS

| | | | | |
|---|---|---|---|---|
| 4,035,051 | A * | 7/1977 | Guy | H01R 13/516 439/464 |
| 4,640,479 | A * | 2/1987 | Shely | H02G 3/0641 16/2.2 |
| 4,842,549 | A * | 6/1989 | Asick | H01R 13/5837 439/455 |
| 7,109,421 | B2 * | 9/2006 | Sekino | B60R 16/0215 174/72 A |
| 7,527,520 | B2 * | 5/2009 | Nitobe | H01R 13/5812 439/464 |
| 9,006,572 | B2 * | 4/2015 | Takeuchi | H02G 3/32 174/72 A |
| 9,466,960 | B2 * | 10/2016 | Takeuchi | H02G 3/32 |
| 9,656,622 | B2 * | 5/2017 | Lee | F16L 55/02 |
| 9,787,069 | B2 * | 10/2017 | Yoshida | F16L 3/1211 |
| 9,970,586 | B2 * | 5/2018 | Cetnar | B60T 17/046 |
| 10,196,013 | B2 * | 2/2019 | Pantino | F16L 3/12 |
| 10,207,658 | B2 * | 2/2019 | Chambosse | F16L 3/1058 |
| 10,243,338 | B2 * | 3/2019 | Adachi | H02G 3/32 |
| 10,457,227 | B2 * | 10/2019 | Sone | H01R 13/56 |
| 10,461,515 | B2 * | 10/2019 | Namiki | H02G 3/0418 |
| 10,473,240 | B2 * | 11/2019 | Erkelens | F16L 3/137 |
| 10,516,230 | B2 * | 12/2019 | Kot | H01R 13/582 |
| 10,759,359 | B1 * | 9/2020 | Komori | H01B 7/0045 |
| 10,821,918 | B2 * | 11/2020 | Uematsu | B60R 16/0215 |
| 2004/0154817 | A1 * | 8/2004 | Sudo | H02G 3/0468 174/481 |
| 2007/0187144 | A1 * | 8/2007 | Kato | B60R 16/0215 174/72 A |
| 2014/0080351 | A1 * | 3/2014 | Kawakami | H01R 13/5804 439/464 |
| 2019/0148924 | A1 * | 5/2019 | Hara | H02G 3/32 174/72 A |
| 2019/0288445 | A1 * | 9/2019 | Komori | H01R 13/5825 |
| 2020/0251890 | A1 * | 8/2020 | Yamauchi | H02G 3/0437 |
| 2020/0406838 | A1 * | 12/2020 | Menez | B60R 16/0215 |
| 2021/0122305 | A1 * | 4/2021 | Tasaka | H02G 3/0462 |

* cited by examiner

HOLDING STRUCTURE FOR ELONGATED MEMBER

BACKGROUND

Field of the Invention

This specification relates to a holding structure for an elongated member.

Related Art

A known wiring harness includes a wire and an external member, such as a corrugated tube, to be mounted externally on this wire. The wiring harness then is routed in an automotive vehicle. Japanese Unexamined Patent Publication No. 2016-181961 discloses a configuration that assembles a holding member with the external member and binds the wire and the holding member by a binding band to fix the wire to the external member in such a wiring harness.

In the above-described configuration, both the wire and the holding member are bound. Thus, the wire hardly is allowed to move with respect to the holding member or with respect to the external member assembled with the holding member. Thus, manufacturing tolerances of a mating component to be connected to the wire and assembling tolerances between the mating component and the wiring harness cannot be absorbed and the wiring harness and the mating component may not be assembled properly. Further, the binding band is not in contact with the wire over the entire circumference. Thus, a wire binding position may deviate if a strong tensile force is applied to the wire.

SUMMARY

A holding structure for elongated member disclosed by this specification includes an elongated member, a binding band to be wound on and fixed to the elongated member, and an external member to be mounted externally on the elongated member The external member includes a restricting groove for receiving the binding band. Displacement of the elongated member with respect to the external member is restricted by the binding band being locked to an inner wall of the restricting groove.

According to the above configuration, manufacturing tolerances of a mating component to be connected to the wire and assembling tolerances between the mating component and a wiring harness can be absorbed by setting a certain clearance between the binding band and the inner wall of the restricting groove. Further, the binding band can be brought into contact with the elongated member over the entire circumference. Thus deviation of a winding position of the binding band on the elongated member can be suppressed even if a tensile force is applied to the elongated member.

In the above configuration, the elongated member may be a wire, and the external member may be a housing for holding the wire.

According to by this specification, it is possible to provide a holding structure for elongated member capable of absorbing tolerances and suppressing the deviation of a winding position of a binding band on an elongated member.

DETAILED DESCRIPTION

Figure 1:
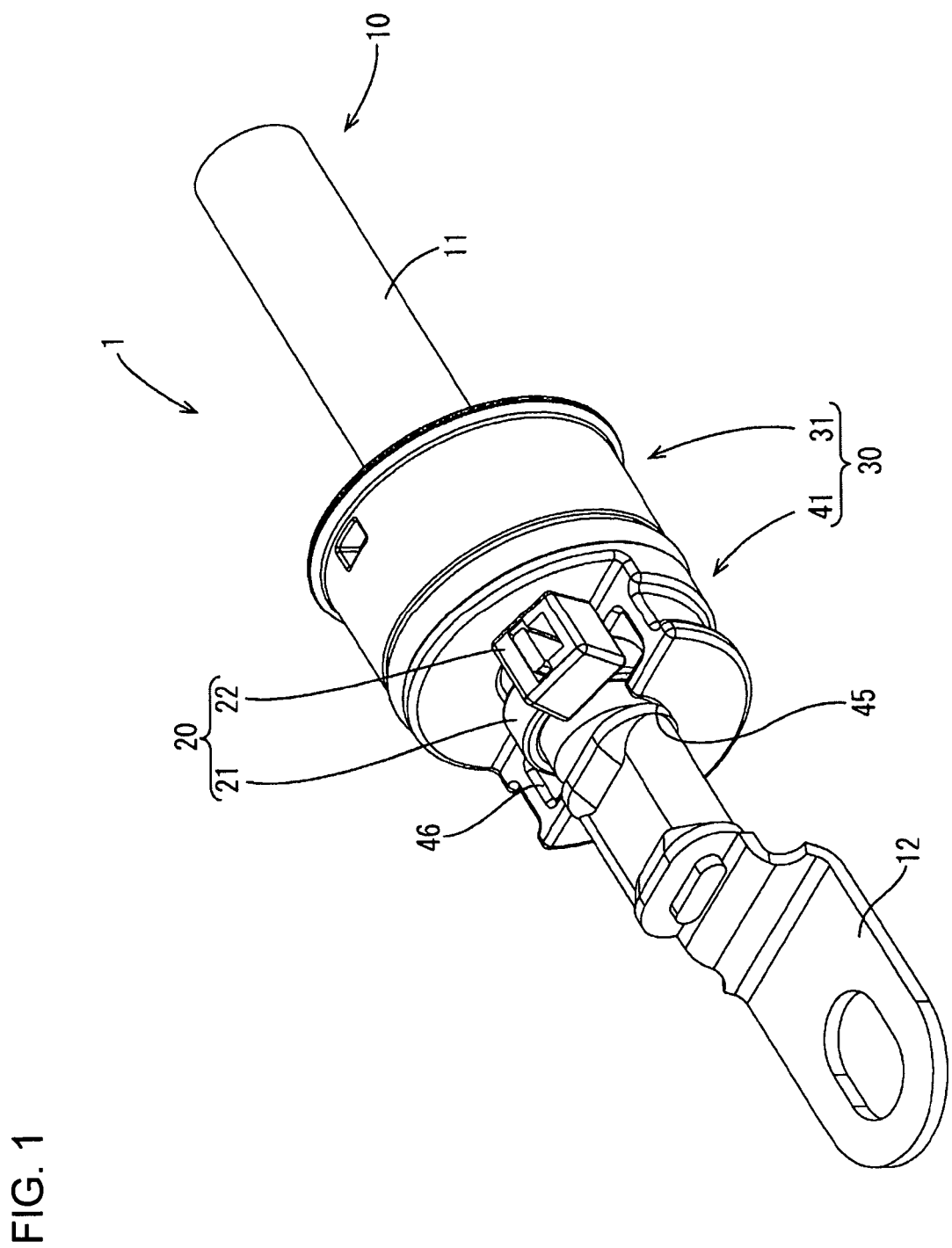
FIG. 1 is a perspective view of a wiring harness of an embodiment.

An embodiment is described with reference to FIGS. 1 to 7. A holding structure for elongated member of this embodiment is a part of a wiring harness 1 to be assembled with a case C of a device mounted in a vehicle. The wiring harness 1 includes a wire with terminal 10 having a wire 11 (corresponding to an elongated member), a binding band 20 to be wound on and fixed to the wire 11 and a housing 30 (corresponding to an external member) to be mounted externally on the wire 11.

Figure 4:
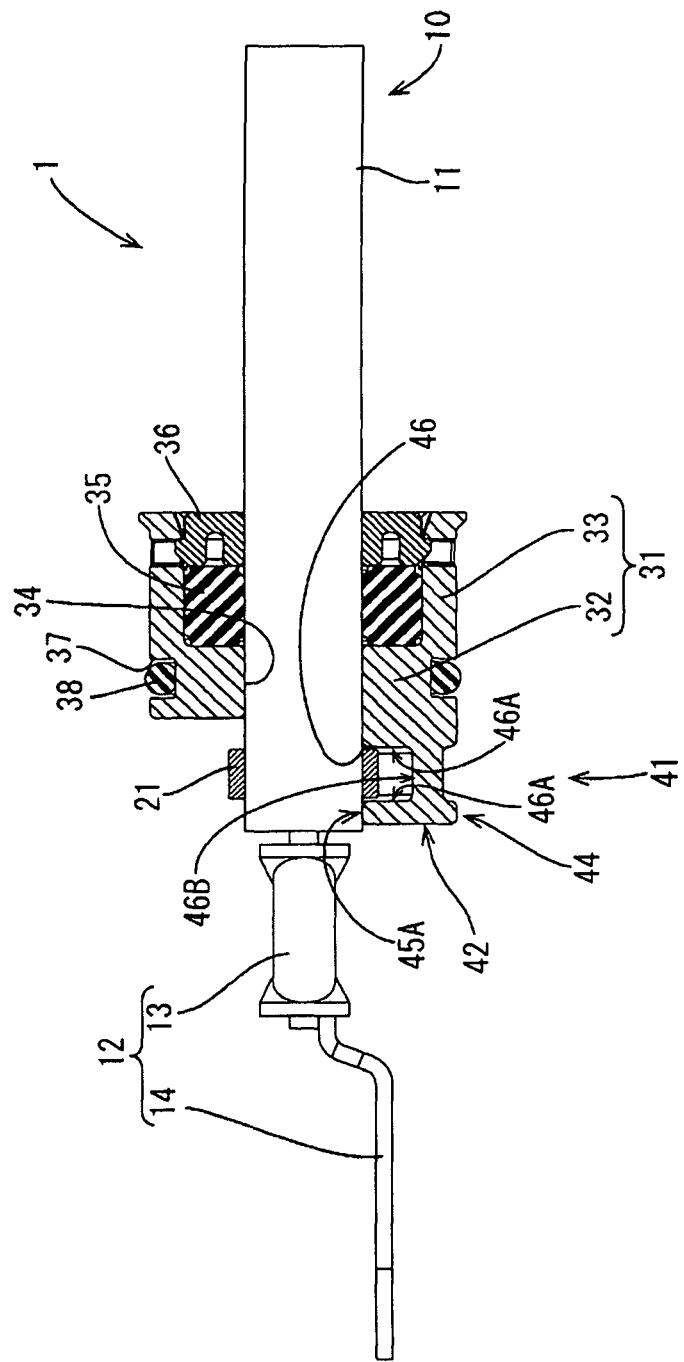
FIG. 4 is a section along A-A of FIG. 2.

As shown in FIG. 4, the wire with terminal 10 has a terminal fitting 12 connected to an end of the wire 11. The terminal fitting 12 includes a crimping portion 13 to be crimped to the end of the wire 11 and a connecting portion 14 continuous from the crimping portion 13. Note that a cross-section of the wire with terminal 10 is not shown in detail in FIGS. 4, 5 and 7 and is shown schematically.

Figure 5:
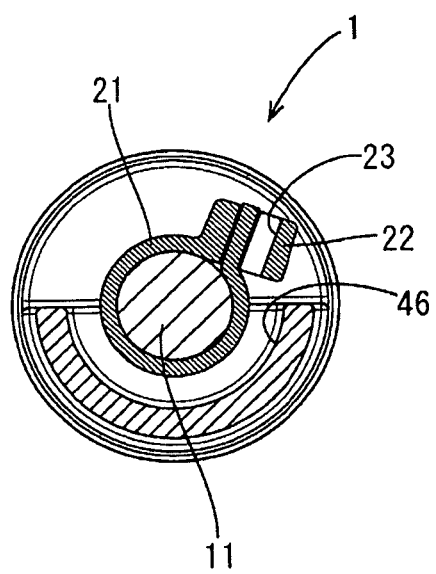
FIG. 5 is a section along B-B of FIG. 3.

The binding band 20 is made of synthetic resin and has a known configuration with a band 21 in the form of an elongated strip and a head 22 provided on one end of the band 21, as shown in FIGS. 1 and 5. Although not shown in detail, a multitude of sawtooth-like locking projections are arranged side by side on one surface of the band 21. On the other hand, the head 22 is provided with a band insertion hole 23 through which the band 21 is insertable. Although not shown in detail, a locking piece is provided on the inner surface of this band insertion hole 23. The band 21 can be displaced in an inserting direction with respect to the head 22, but the locking projection catches the locking piece to prevent displacement in a withdrawing direction.

If the band 21 is looped around the wire 11, inserted into the head 22 and tightened so that the binding band 20 is wound releasably on and fixed to the wire 11.

The housing 30 is made of synthetic resin and includes, as shown in FIG. 1, a housing body 31 and a holding portion 41 continuous from the housing body 31.

As shown in FIG. 4, the housing body 31 includes a base wall 32 in the form of a thick disc and a cylindrical tubular portion 33 extending perpendicular to the base wall 32 from a peripheral edge of the base wall 32. The base wall 32 includes a wire insertion hole 34 at a center position of the disc, and the wire 11 is insertable the wire insertion hole 34. A rubber plug 35 and a retainer 36 are accommodated inside the tubular portion 33. The rubber plug 35 provides sealing between the wire 11 and an inner surface of the tubular portion 33 and the retainer 36 retains the rubber plug 35. A seal mounting groove 37 extends over the entire circumference in an outer peripheral surface of the housing body 31, and a seal ring 38 is fit in the seal mounting groove 37 for sealing between the housing body 31 and the case C of the mating device.

As shown in FIG. 1, the holding portion 41 is a semi-cylindrical member extending from a surface of the base wall 32 opposite to the tubular portion 33, and is arranged concentrically with the base wall 32. An outer surface of the holding portion 41 includes a semicircular end surface 42 parallel to the base wall portion 32, a flat surface 43 extending from a part of the end surface 42 constituting a diameter of a semicircle to the base wall 32 and an arcuate surface 44 extending from a part of the end surface 42 constituting a semicircular arc to the base wall 32 (see also FIGS. 2 and 3).

Figure 2:
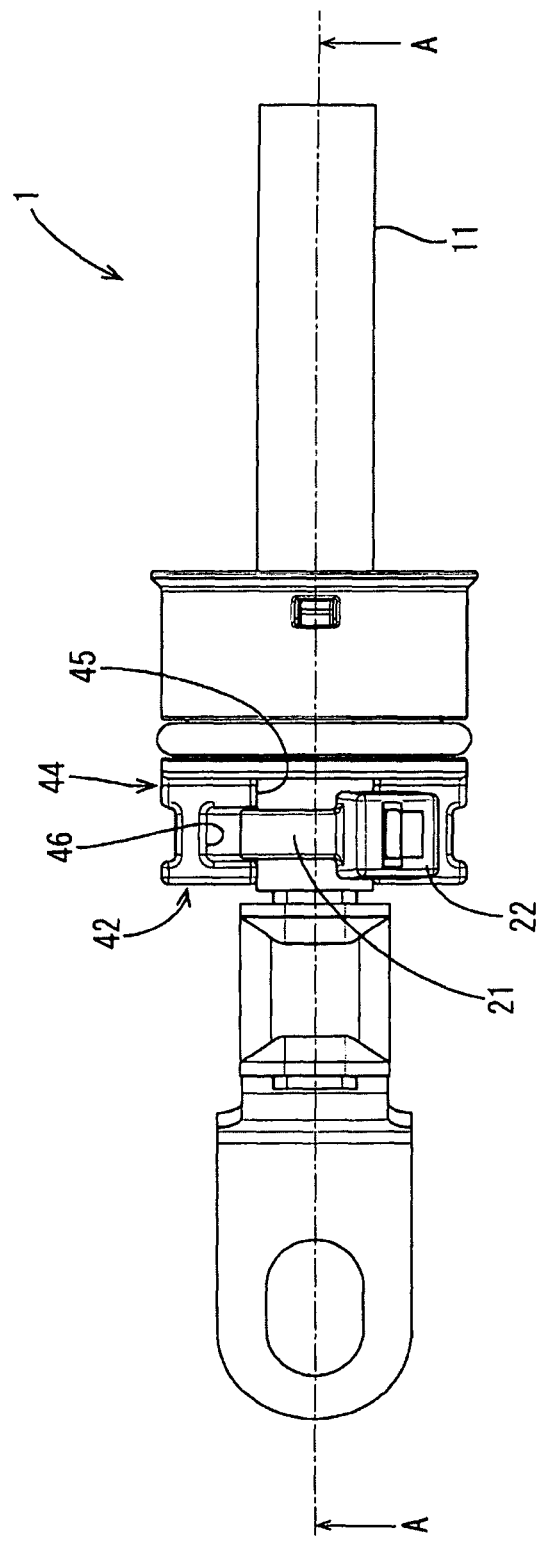
FIG. 2 is a plan view of the wiring harness of the embodiment.

As shown in FIG. 2, the holding portion 41 includes a wire receiving groove 45 for receiving the wire 11 inside and a restricting groove 46 for receiving the band 21 of the binding band 20 inside.

Figure 6:
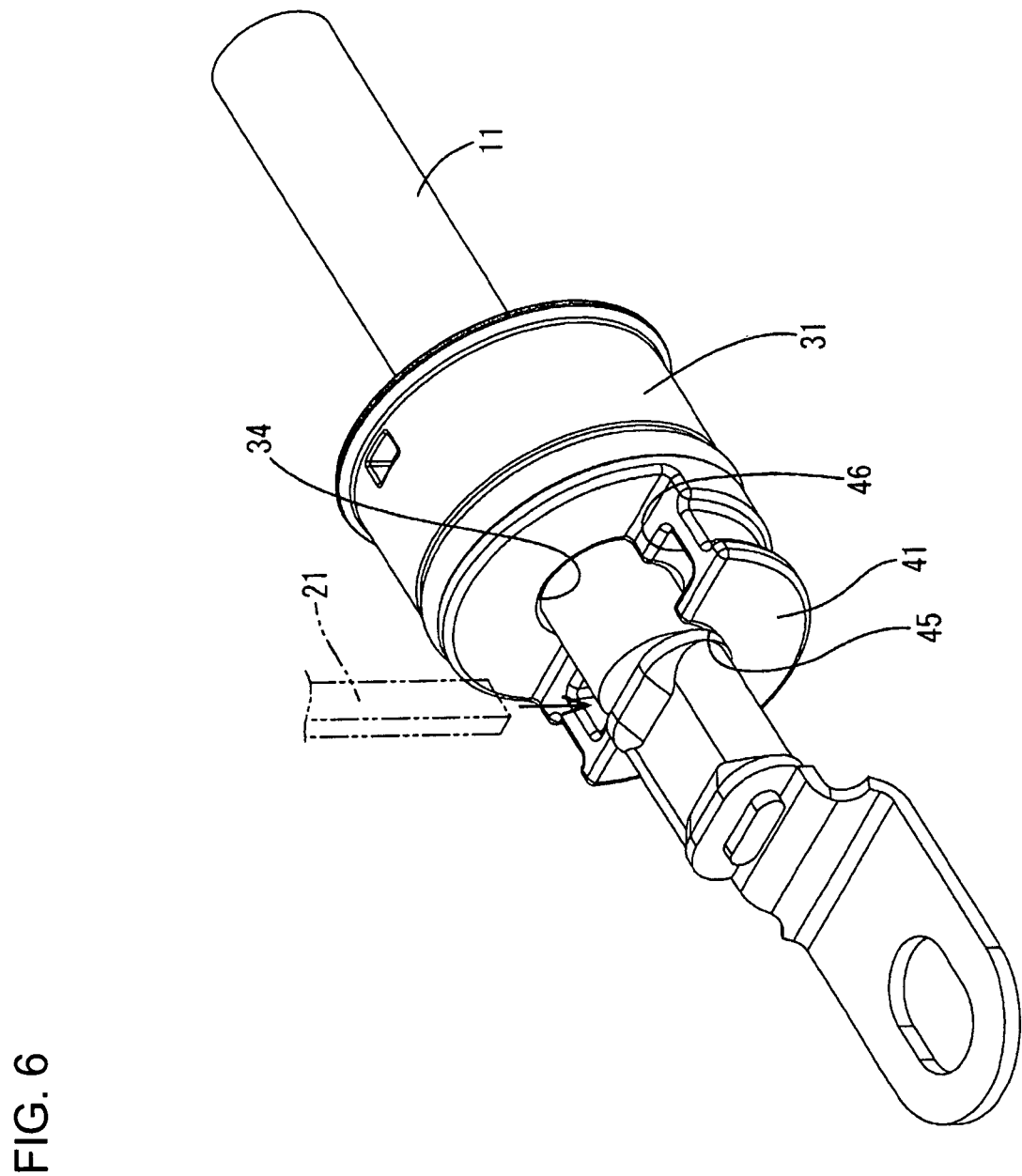
FIG. 6 is a perspective view showing a step of winding a binding band on a wire having a housing mounted thereon.
Figure 7:
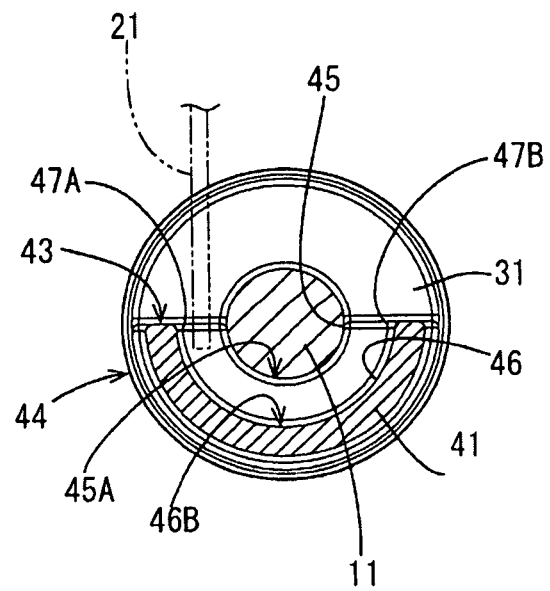
FIG. 7 is a section showing the step of winding the binding band on the wire having the housing mounted thereon.

As shown in FIGS. 2, 6 and 7, the wire receiving groove 45 is in the form of a half pipe recessed from the flat surface 43, and defined by a groove inner surface 45A extending from a hole edge of the wire insertion hole 34 to the end surface 42.

The restricting groove 46 is recessed out toward the arcuate surface 44 from the groove inner surface 45A, as shown in FIGS. 2, 4, 6 and 7, and is defined by two groove side surfaces 46A (corresponding to an inner wall) arranged opposite to each other and a groove bottom surface 46B coupling the groove side surfaces 46A and extending in a curved manner in conformity with the curved shape of the arcuate surface 44, as shown in FIGS. 4 and 5. Further, the restricting groove 46 includes openings 47A, 47B respectively open in the flat surface 43 on both ends. A width (distance between the groove side surfaces 46A) of the restricting groove 46 is slightly larger than that of the band 21. Further, a depth (distance between the groove inner surface 45A and the groove bottom surface 46B) of the restricting groove 46 is larger than a thickness of the band 21.

The housing 30 and the binding band 20 are mounted on the wire with terminal 10, for example, in the following procedure.

First, as shown in FIG. 6, the wire 11 is inserted into the wire insertion hole 34 and the housing 30 is mounted on the wire with terminal 10. A part of the wire 11 near the end connected to the terminal fitting 12 is fit in the wire receiving groove 45.

Figure 3:
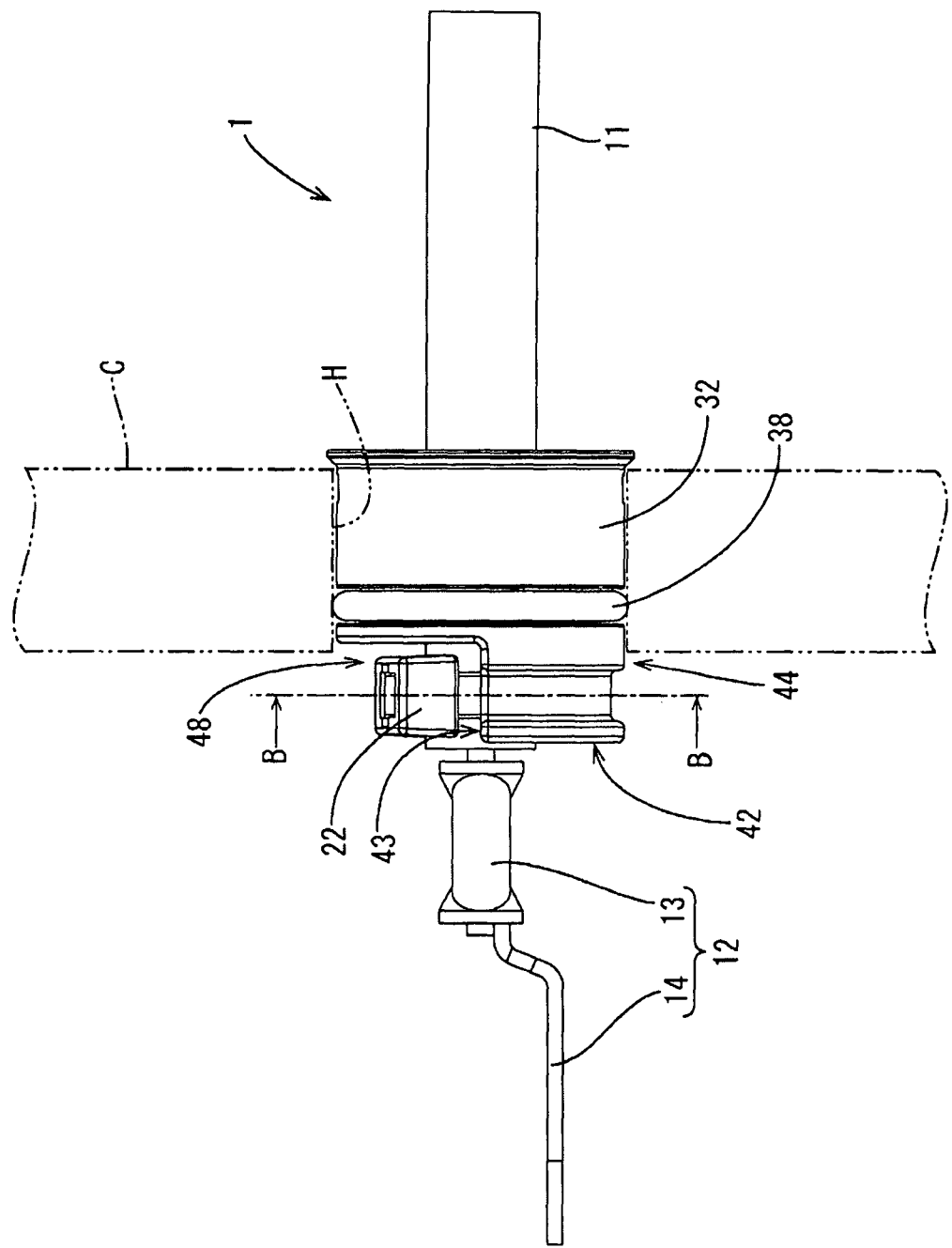
FIG. 3 is a side view of the wiring harness of the embodiment.

Subsequently, as shown in FIGS. 6 and 7, the band 21 of the binding band 20 is inserted through one opening 47A of the restricting groove 46 and a tip part thereof is led out from the opening 47B on an opposite side after circling around the wire 11. Subsequently, the band 21 is inserted into the head 22 to loop the binding band 20, and is tightened and fixed to be tightly wound on the wire 11. The binding band 20 may be tightened to such an extent that the binding band 20 cannot be displaced with respect to the wire 11. A space defined by the base wall 32 and the flat surface 43 in the housing 30 serves as an accommodation space 48, as shown in FIG. 3, and the head 22 is arranged inside this accommodation space 48. Note that the leftover tip part of the band portion 21 is cut so as not to interfere during usage.

With the binding band 20 wound on and fixed to the wire 11, the band 21 is fit inside the restricting groove 46, as shown in FIGS. 4 and 5. If the wire 11 is going to be displaced with respect to the housing 30 in a direction along an extending direction of the wire 11, the band 21 butts against the groove side surface 46A to restrict any further displacement of the wire 11.

When the wiring harness 1 is assembled with the case C of the device, the housing body 31 is fit into a mounting hole H provided in the case C, as shown in FIG. 3. The connecting portion 14 of the terminal fitting 12 is connected to a mating terminal of the device arranged inside the case C by a bolt. Here, the connecting portion 14 and the mating terminal may be deviated slightly positionally due to manufacturing tolerances of the device and assembling tolerances between the case C and the wiring harness 1.

As described above, the width (distance between the groove side surfaces 46A) of the restricting groove 46 is slightly larger than that of the band 21 and slight clearances are present between the band 21 and the groove side surfaces 46A. Thus, the wire with terminal 10 is allowed to move with respect to the housing 30 by the dimensions of these clearances. In this way, the connecting portion 14 and the mating terminal can be connected reliably by absorbing the manufacturing tolerances and assembling tolerances.

As described above, the wiring harness 1 includes the wire 11, the binding band 20 to be wound on and fixed to the wire 11 and the housing 30 to be mounted externally on the wire 11. The housing 30 includes the restricting groove 46 for receiving the binding band 20, and a displacement of the wire 11 with respect to the housing 30 is restricted by the binding band 20 being locked to the groove side surface 46A of the restricting groove 46.

According to the above-described configuration, the manufacturing tolerances of the device and the assembling tolerances between the case C and the wiring harness 1 can be absorbed by setting certain clearances between the binding band 20 and the groove side surfaces 46A. Further, since the binding band 20 can be brought into contact with the wire 11 over the entire circumference, the deviation of a winding position of the binding band 20 on the wire 11 can be suppressed even if a strong tensile force is applied to the wire 11.

The invention is not limited to the above described and illustrated embodiment. For example, the following various modes are also included.

Although one binding band 20 is wound on and fixed to the wire 11 in the above embodiment, two or more binding bands may be wound on and fixed to an elongated member.

Although the elongated member is a wire in the above embodiment, the elongated member is not particularly limited in type, material and the like as long as the elongated member is a long and thin member. For example, the elongated member may be a string, a tube made of synthetic resin, a metal rod material or the like.

Although the external member is a housing in the above embodiment, the external member is not particularly limited in type, material and the like as long as the external member is a member to be externally mounted on the elongated member. For example, the external member may be a tube made of synthetic resin, a metal pipe, a shield shell or the like.

LIST OF REFERENCE SIGNS

1 . . . wiring harness (holding structure for elongated member)
22 . . . wire (elongated member)
20 . . . binding band
30 . . . housing (external member)
46 . . . restricting groove
46A . . . groove side surface (inner wall)

The invention claimed is:
1. A holding structure, comprising:
an external member having opposite first and second ends and including:
a housing body adjacent the first end and an insertion hole extending along an axis through the housing body from the first end of the external member toward the second end thereof, and a holding portion extending from the housing body to the second end of the external member, the holding portion having a flat surface extend from the housing body to the second end of the external member, a receiving groove formed in the flat surface, the receiving groove being aligned with the insertion hole in the housing body and extending from the housing body to the second end of the external member, and a restricting groove recessed in the receiving groove and in portions of the flat surface on opposite sides of the receiving groove;

an elongated member having an outer peripheral surface and extending through the insertion hole and the receiving groove; and a binding band to be wound around the outer peripheral surface of the elongated member, the binding band having an inner peripheral surface directly facing and opposing the outer peripheral surface of the elongated member entirely around the outer peripheral surface of the elongated member, the binding band being engaged in the restricting groove of the holding portion and having an outer peripheral surface defining a diameter that is larger than a diameter of the receiving groove so that the binding band engages areas of the holding portion adjacent the receiving groove to restrict movement of the elongated member between the opposite first and second ends of the external member.

2. The holding structure for elongated member of claim 1, wherein:

the elongated member is a wire, and the external member is a housing for holding the wire.

3. The holding structure of claim 1, wherein the restricting groove has opposite first and second surfaces facing toward one another, and the binding band has opposite first and second side edges facing the respective first and second surfaces of the receiving groove to restrict longitudinal movement of the elongated member relative to the external member.

* * * * *